United States Patent [19]

Rose et al.

[11] Patent Number: 5,058,041

[45] Date of Patent: Oct. 15, 1991

[54] SEMAPHORE CONTROLLED VIDEO CHIP LOADING IN A COMPUTER VIDEO GRAPHICS SYSTEM

[76] Inventors: Robert C. Rose, 38 Old North Rd., Hudson, Mass. 01749; Larry D. Seiler, 198 Linden St., Boylston, Mass. 01505; James L. Pappas, 23 Barry La., Leominster, Mass. 01453

[21] Appl. No.: 206,203

[22] Filed: Jun. 13, 1988

[51] Int. Cl.[5] .................. G06F 15/72

[52] U.S. Cl. .................. 364/521; 364/518; 364/457.5; 340/750

[58] Field of Search ... 364/518, 521, 522, 200 MS File, 364/900 MS File; 340/747, 750, 718, 703

[56] References Cited

U.S. PATENT DOCUMENTS

| | | | |
|---|---|---|---|
| 4,204,206 | 5/1980 | Bakula et al. | 340/721 |
| 4,386,410 | 5/1983 | Pandya et al. | 364/518 |
| 4,412,294 | 10/1983 | Watts et al. | 364/518 |
| 4,542,376 | 9/1985 | Bass et al. | 340/724 |
| 4,550,315 | 10/1985 | Bass et al. | 340/703 |
| 4,700,320 | 10/1987 | Kapur | 364/521 |
| 4,710,761 | 12/1987 | Kapur et al. | 340/721 |
| 4,710,767 | 12/1987 | Sciacero et al. | 340/799 |
| 4,720,803 | 1/1988 | Ishii | 364/521 |
| 4,727,425 | 2/1988 | Mayne et al. | 358/80 |
| 4,751,446 | 6/1988 | Pineda et al. | 340/703 |
| 4,752,893 | 6/1988 | Guttag et al. | 364/518 |
| 4,774,678 | 9/1988 | David et al. | 364/518 |
| 4,791,580 | 12/1988 | Sherull et al. | 364/521 |
| 4,800,380 | 1/1989 | Lowenthal et al. | 340/750 |
| 4,801,930 | 1/1989 | Tsuchiya et al. | 340/703 |
| 4,808,989 | 2/1989 | Tabata et al. | 340/750 |
| 4,812,996 | 3/1989 | Stubbs | 364/487 |
| 4,815,010 | 3/1989 | O'Donnell | 364/521 |
| 4,815,012 | 3/1989 | Feintuch | 364/521 |
| 4,823,303 | 4/1989 | Terasawa | 364/521 |
| 4,894,653 | 1/1990 | Frankenbach | 340/703 |

*Primary Examiner*—Gary V. Harkcom
*Assistant Examiner*—Phu K. Nguyen

[57] ABSTRACT

A method and apparatus for updating the copies of state table values of a video data path chip set for a computer graphics system is provided. The apparatus uses off screen bitmap memory or other dual-ported memory in a frame buffer to store a shadow copy of the state that is stored in the video data path chips. The state tables include such things as color lookup tables, window definitions and cursors. A semaphore is used to prevent screen glitches caused by updating state tables from the copy of state table values that are partially modified. The state tables are loaded into the chips during vertical retrace, when the screen is being blanked. Before the CPU begins to update the shadow copy in the frame buffer, it claims the semaphore. If a vertical retrace occurs before the CPU has completed updating the frame buffer, the chips are not loaded during that vertical retrace. Before the chips start loading, a system timing chip claims the semaphore. The CPU cannot commence modifying the frame buffer until the load is finished.

16 Claims, 6 Drawing Sheets

SEMAPHORE CONTROLLED VIDEO CHIP LOADING IN A COMPUTER VIDEO GRAPHICS SYSTEM

RELATED APPLICATIONS

This invention is related to the following applications, all of which are assigned to the assignee of the present invention and concurrently filed herewith in the names of the inventors of the present invention:

Pixel Lookup in Multiple Variably-Sized Hardware Virtual Colormaps in a Computer Video Graphics System, Ser. No. 206,026, now U.S. Pat. No. 5,025,249.

Datapath Chip Test Architecture, Ser. No. 206,194, now U.S. Pat. No. 4,929,889.

Window Dependent Pixel Datatypes in a Computer Video Graphics System, Ser. No. 206,031.

Apparatus and Method For Specifying Windows With Priority Ordered Rectangles in a Computer Video Graphics System, Ser. No. 206,030, now abandoned.

BACKGROUND OF THE INVENTION

This invention relates generally to the field of computer video display systems. More particularly, this invention relates to a computer video graphics system having state tables and to a method for controlling data flow relative to the state tables.

In computer video graphics systems, a monitor displays frames of information provided by a frame buffer many times a second. The subsystem of a video graphics system between the frame buffer and the monitor is called the video data path. Typically, a video data path comprises a system of logic and memory elements, such as color lookup tables and other state tables, which perform a variety of functions. As the format and content of video data becomes increasingly complex, the capability of video displays increases. For example, providing the feature of so-called windows in graphics systems increases the demand on and complexity of the video data path. To define window boundaries and other window attributes or characteristics, large volumes of digital data in the form of state information are called for. State information is also called for to define cursor characteristics. Such data must be loaded into state tables in the video data path. If the state information changes during a refresh of the monitor screen, the monitor screen will show a glitch because the data displayed represents a combination of both current and superceded or invalid states.

In known video graphics systems, a general purpose microprocessor interface has been used to load the state tables. The computer CPU synchronized itself to vertical retrace and completed the updating of the state tables before retrace was finished. This worked satisfactorily for relatively small state tables because the entire loading of the state tables could be completed during the retrace period, typically on the order of a few microseconds. But, updating of larger state tables would cause screen glitches or anomalies, because there is a sharp limit to the number of microprocessor write cycles that can occur during vertical retrace. For example, in a system having a 256 entry colormap, glitches may occur if the entire color map is changed during a retrace period.

Other known systems have incorporated higher speed data path loading from a so-called shadow copy of the state tables in an off-screen bitmap memory. Such systems solved part of the problem because the frame buffer bus had enough bandwidth to load more state data in larger state tables than previous systems during vertical retrace. However, the CPU still synchronized itself to vertical retrace when modifying the shadow copy of the state tables in the frame buffer. Also, once the CPU began to load the shadow copy of the state tables, it completed the loading without pause. This is practical with small colormaps such as, for example, sixteen entry colormaps, but is impractical when the state tables become large since they cannot be loaded during one vertical retrace.

It would be desirable to have a computer video graphics system which ensured that no data is loaded into the shadow copy of the state tables while they are being accessed. It also would be desirable to have a computer graphics system which allows pauses during the write cycle of the shadow copy of the state tables. If the state data need to be stored in more pixels than are displayed in one scanline on the screen, then a sustained transfer may not be possible. It would be advantageous to allow the load process to be paused during horizontal retrace, thus allowing the same timing to be used for data loading as for screen display.

It is known to use so-called semaphores in computer systems. Semaphores are arbitration devices used to coordinate the activities of two or more programs or processes that are running at the same time and sharing information. They are known to be used for elementary interprocess communication, to guarantee access to shared data, to protect a section of code that must be executed without certain kinds of interruptions (such a code segment is called a critical region or critical section), or to allocate a set of identical scarce resources. For a further explanation of semaphores, see Encyclopedia of Computer Science and Engineering, Second Edition, Anthony Ralston (editor), Van Nostrand Reinhold Company, New York (1983) at page 1311 for an article by M. Shaw entitled "Semaphore," which is hereby incorporated by reference.

It would be advantageous for a computer video graphics system to employ semaphores for controlling the read or write cycles to the shadow copy of the state tables to ensure the integrity of the data provided to the monitor.

SUMMARY OF THE INVENTION

The present invention is generally directed to solving the foregoing and other problems, as well as satisfying the recited shortcomings of known computer graphics systems. The invention features a semaphore which provides access to the data in the shadow copy of state tables either by a video graphics subsystem CPU upon initiation of state table data loading or by a graphics display when the state table data are being read out. The semaphore guarantees the integrity of the state table data by ensuring that either a read or a write cycle to the shadow copy of the state tables is completed once it is begun, sufficiently timely to avoid glitches on the monitor.

If the graphics display is not reading from the shadow copy of the state table data, access to the shadow copy of the state table data is available for writing by the graphics subsystem central processing unit. Once the graphics subsystem central processing unit begins to write to the shadow copy of the state table data, the graphics display is "locked out" and is precluded from reading from the shadow copy of the state table data. When the central processing unit has completed updating the information in the shadow copy, it is once again available to either the central processing unit or the graphics display. When the graphics display begins to read the contents of the shadow copy of the state table data, the central processing unit is "locked out" and cannot update the contents of the shadow copy of the state table data until the graphics display has completed reading the contents of the shadow copy. When the graphics display has completed reading the contents of the shadow copy, it is once again available for access by either the central processing unit or the graphics display.

BRIEF DESCRIPTION OF THE DRAWINGS

The above-noted and other aspects of the present invention will become more apparent from a description of the preferred embodiment when read in conjunction with the accompanying drawings.

The drawings illustrate the preferred embodiment of the invention, wherein like members bear like reference numerals and wherein.

DESCRIPTION OF A PREFERRED EMBODIMENT

Figure 1:
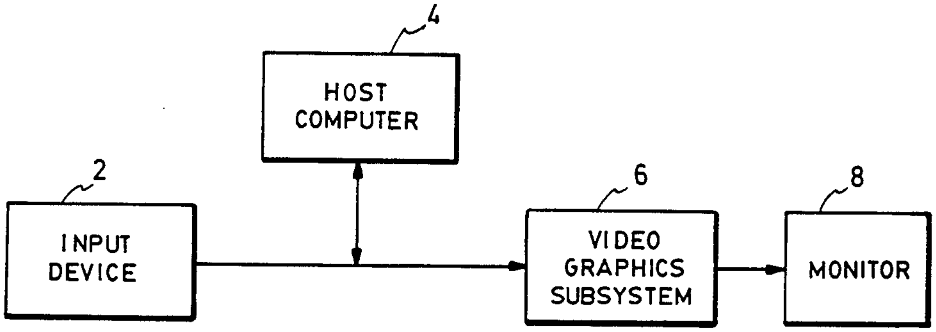
FIG. 1 is a general block diagram of a computer video graphics system employing the invention.

Referring to FIG. 1, a general block diagram of a video graphics system which employs the present invention is shown. An input device 2 functions as the means by which a user communicates with the system, such as a keyboard, a mouse or other input device. A general purpose host computer 4 is coupled to the input device 2 and serves as the main data processing unit of the system. In a preferred embodiment, the host computer 4 employs VAX architecture, as presently sold by the assignee of the present invention. A video graphics subsystem 6 receives data and graphics commands from the host computer 4 and processes that data into a form displayable by a monitor 8. The video graphics subsystem 6 features the use of large volume state tables for storing state data. According to the invention, the video graphics subsystem 6 is specially adapted to provide a large volume of state data to the monitor for glitch-free display. In a preferred embodiment, the monitor 8 is an RGB CRT monitor.

Figure 2:
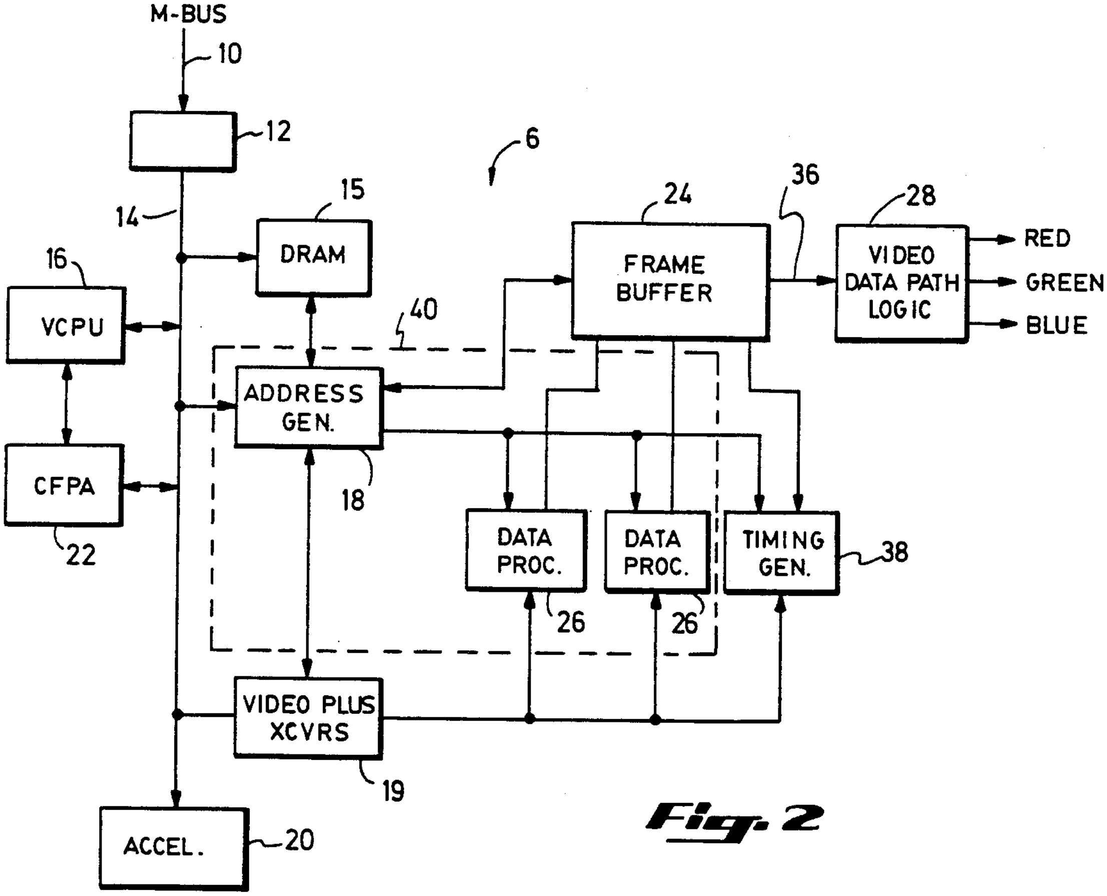
FIG. 2 is a block diagram of a video graphics subsystem employing the present invention.

Referring now to FIG. 2, an embodiment of a video graphics subsystem 6 which employs the present invention is shown. This graphics subsystem is an interactive video generator which may be used for two-dimensional (2D) and three-dimensional (3D) graphics applications.

The graphics subsystem 6 receives graphics commands and data from the host Central Processing Unit (CPU) in the host computer 4 by way of a memory bus (M-Bus) 10. The host CPU communicates with a video graphics subsystem bus (VI-Bus) 14 by way of an interface 12. The interface 12 performs all functions necessary for synchronous communication between the M-Bus 10 of the host CPU and the VI-Bus 14 of the graphics subsystem 6. The interface 12 is of conventional design and decodes single transfer I/O read and write cycles from the M-Bus and translates them into VI-Bus cycles for the graphics subsystem in a manner known in the art. The interface 12 also supports Direct Memory Access (DMA) transfers over the M-Bus 10 between the workstation main memory in the host computer 4 and a video graphics system dynamic random access memory (DRAM) 15. DMA transfer is a technique known in the art whereby a block of data, rather than an individual word or byte, may be transferred from one memory to another.

A graphics subsystem CPU (VCPU) 16 is provided as the main processing unit of the video graphics subsystem 6. All requests by the host CPU for access to the graphics subsystem (via the M-Bus 10/interface 12) go through an address generator 18 which serves as the arbitrator for the VI-Bus 14. There are three possible masters seeking access to the VI-Bus 14: the VCPU 16, the interface 12 and an accelerator 20. The address generator 18 grants bus mastership on a tightly coupled, fixed priority basis. The VCPU 16 is the default bus master. The accelerator 20 serves as a co-processor with the VCPU 16.

The VCPU 16 also employs a floating point unit (CFPA) 22. The VCPU 16/CFPA 22 form the main controller of the graphics subsystem 6. This combination loads all graphics data to the graphics subsystem, provides memory management, an instruction memory, and downloads the initial code store of the accelerator 20.

As used herein, the term graphics rendering is understood to mean the process of interpreting graphics commands and data received from the host CPU 4 and generating resultant pixel data. The resultant pixel data is stored in so-called on-screen or off-screen memory in a frame buffer 24. The graphics rendering section of the graphics subsystem is implemented in the address generator 18 and a set of data processors 26. These logic elements translate addresses received from the host CPU 4 into pixel data addresses and manipulate pixel data. The address generator 18 and the data processors 26 make up a pixel drawing engine 40. Video bus transceivers (XCVRs) 19 perform a read/write function to accommodate the additional load on the VI-Bus 14 by the data processors 26 and the timing generator 38.

Figure 3:
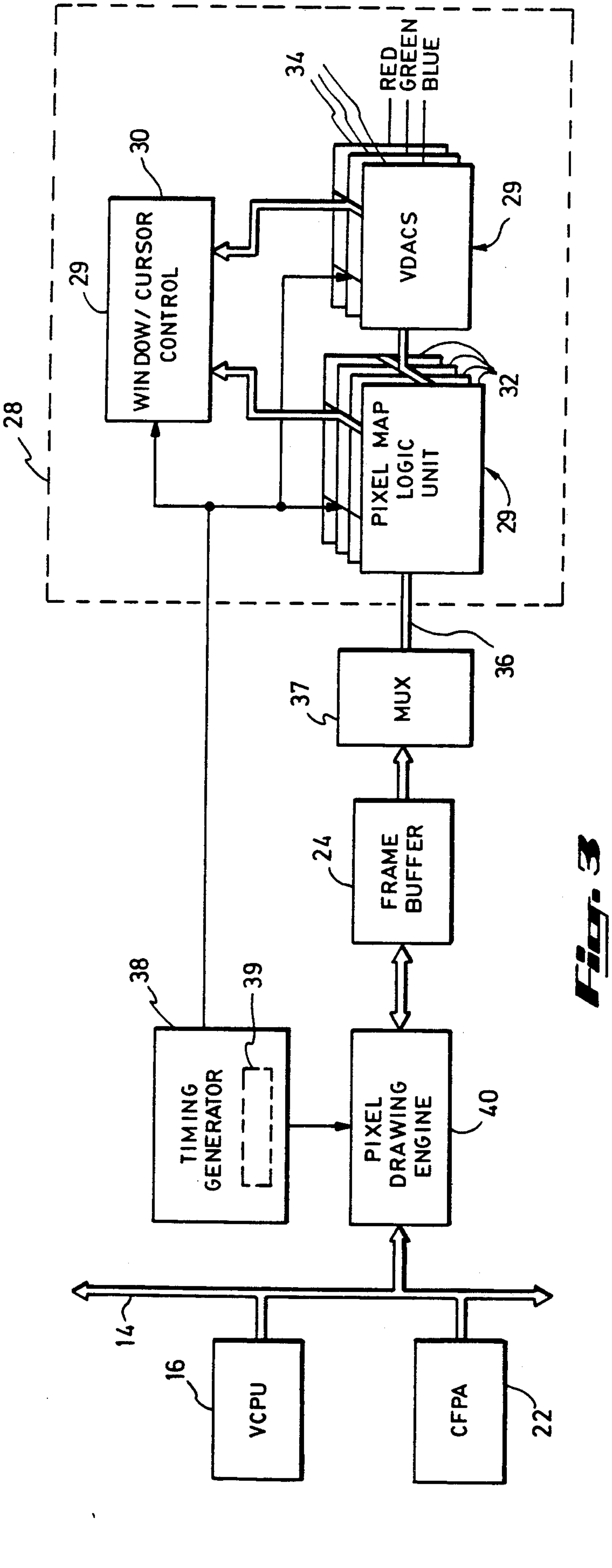
FIG. 3 is a block diagram showing further detail of a video graphics subsystem employing the present invention.

As used herein, the term graphics display is understood to refer to the process of outputting the pixel data from the frame buffer 24 to a viewing surface, preferably the monitor 8. A video graphics datapath logic section 28 of the graphics subsystem of FIG. 2 is provided. Referring to FIG. 3, the logic section 28 comprises a window/cursor control 30, a set of pixel map logic units 32 and a set of colormaps and digital to analog converters (VDACs) 34. Collectively, the window/cursor control 30, the pixel map logic units 32 and the VDACs 34 may be referred to hereinafter as the video graphics or data path logic units 29. In a preferred embodiment, one window/cursor control 30, four pixel map logic units 32 and three VDACs 34 are provided and each of these data path logic units is implemented on a separate integrated circuit chip. The video graphics data path logic section 28 defines the windows on the monitor screen and determines the source within the frame buffer 24 which will provide the pixel data for the current window. The video graphics data path logic section 28 also converts the digital information in the video graphics subsystem to an analog form to be displayed on monitor 8. This data includes bitmap memory, overlay plane or cursor, as described more fully with relation to FIGS. 4–6.

FIG. 3 depicts a preferred embodiment of the present invention for loading data into data path logic unit registers (state tables) in the video data path logic section 28. These data are stored in so-called off-screen scanlines of the frame buffer 24 or other dual-ported memory and are loaded automatically into the window/cursor controls 30, the pixel map logic units 32 and the VDACs 34 by the screen refresh process starting after the last displayable scan. Data for the data path logic units 29 are sequentially loaded through four-bit inputs 36 starting with the least significant bit ("LSB") of the first data path logic unit register ("register <0>") in the data path proceeding through the most significant bit ("MSB") of the last register of the last data path logic unit 29. A single four bit input 36 is used to load data into the state tables of each logic unit. Each input 36 is four bits wide so that data can be transferred and processed at one quarter of the full pixel rate. There are also as many inputs 36, each four bits wide, as there are bits in a pixel; for example, if 24 bits define a pixel, there will be 24 such inputs 36. There may also be additional inputs 36 to accommodate cursor data and overlay plane data as described below. A multiplexer 37 takes the data in the frame buffer 24 and feeds this data to the data path logic units 29 serially four bits at a time. Logic (not shown) generates the sequential addresses for the various registers in the data path logic units 29 in a manner known in the art.

A timing generator 38 is provided to control the loading and output of display data in on-screen memory of frame buffer 24, the loading of data in off-screen memory for the video output logic section 28 and the generation of timing signals for the monitor 8. Off-screen memory of the frame buffer 24 includes a copy of the data in the state tables of the data path logic units 29. The timing signals for the monitor 8 include conventional horizontal and vertical synchronization (sync) and blank signals.

The timing generator 38 includes a semaphore register 39. A semaphore is a control device to which atomic access is provided. Atomic access means that the control device can be read and modified by one process without any other process being able to read or modify it until the first process is complete and the semaphore is relinquished. Preferably the semaphore is implemented employing the data/state of the register 39. In the present invention, a semaphore is employed to arbitrate between two processes: the process of writing into or updating the frame buffer copy of the data in the state tables in the data path logic units 29 and the process of reading the frame buffer copy into the data path state tables. If the off-screen memory of frame buffer 24 is to be updated, the VCPU 16 checks the value of the semaphore register 39 in the timing generator 38 and, if it indicates that the off-screen memory is available (not being read), the VCPU 16 decrements the semaphore register 39 and begins updating the off-screen memory. So long as update is in progress, state table copy values are not read. On the other hand, when the data path state table copy is to be read, the timing generator 38 decrements the semaphore register 39, preventing update by the VCPU 16. The semaphore register 39 is incremented when read or update is complete.

Figure 4:
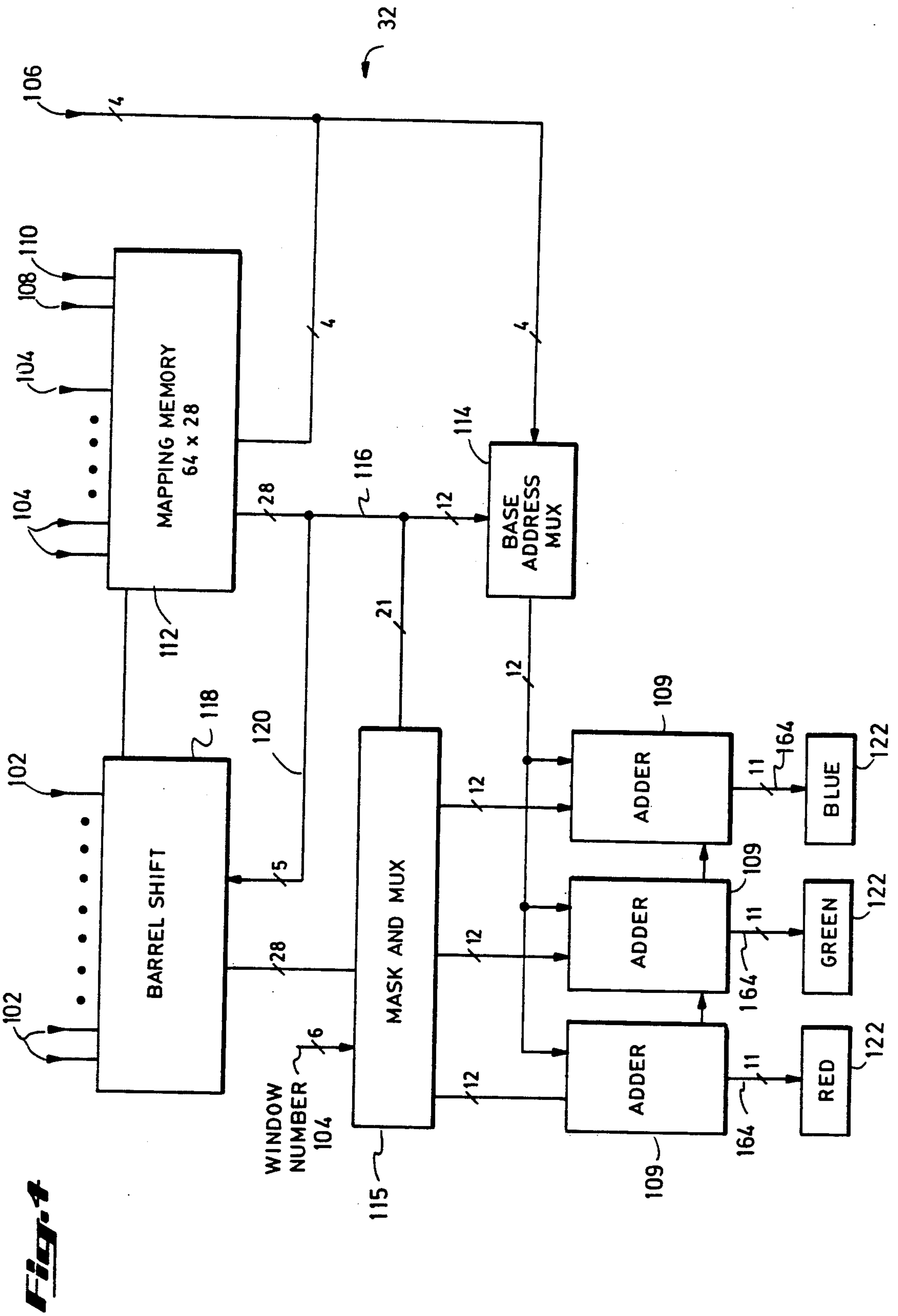
FIG. 4 is a block diagram of a pixel map logic unit which is employed to carry out the present invention.
Figure 5:
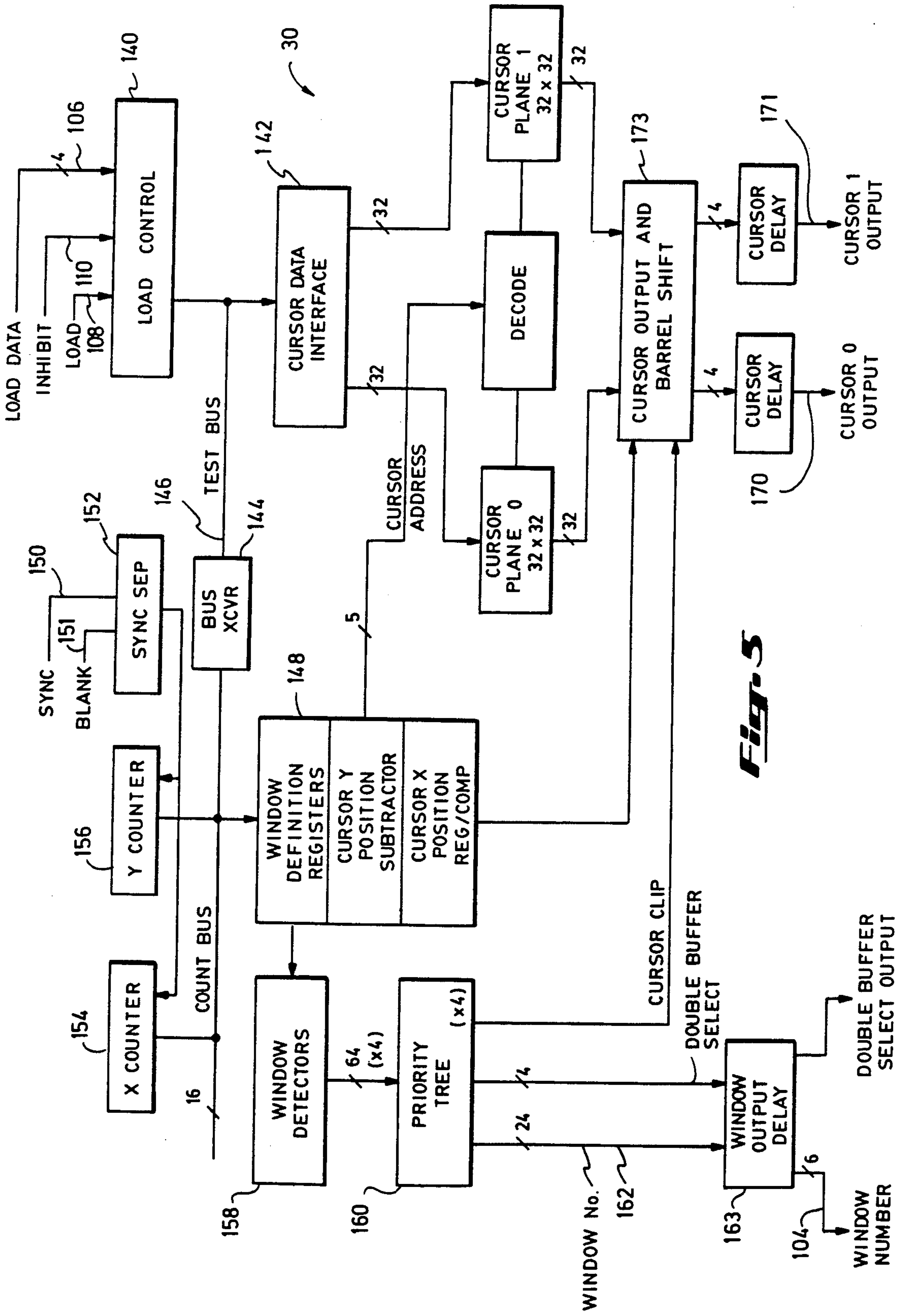
FIG. 5 is a block diagram of a window/cursor control which is employed to carry out the present invention.
Figure 6:
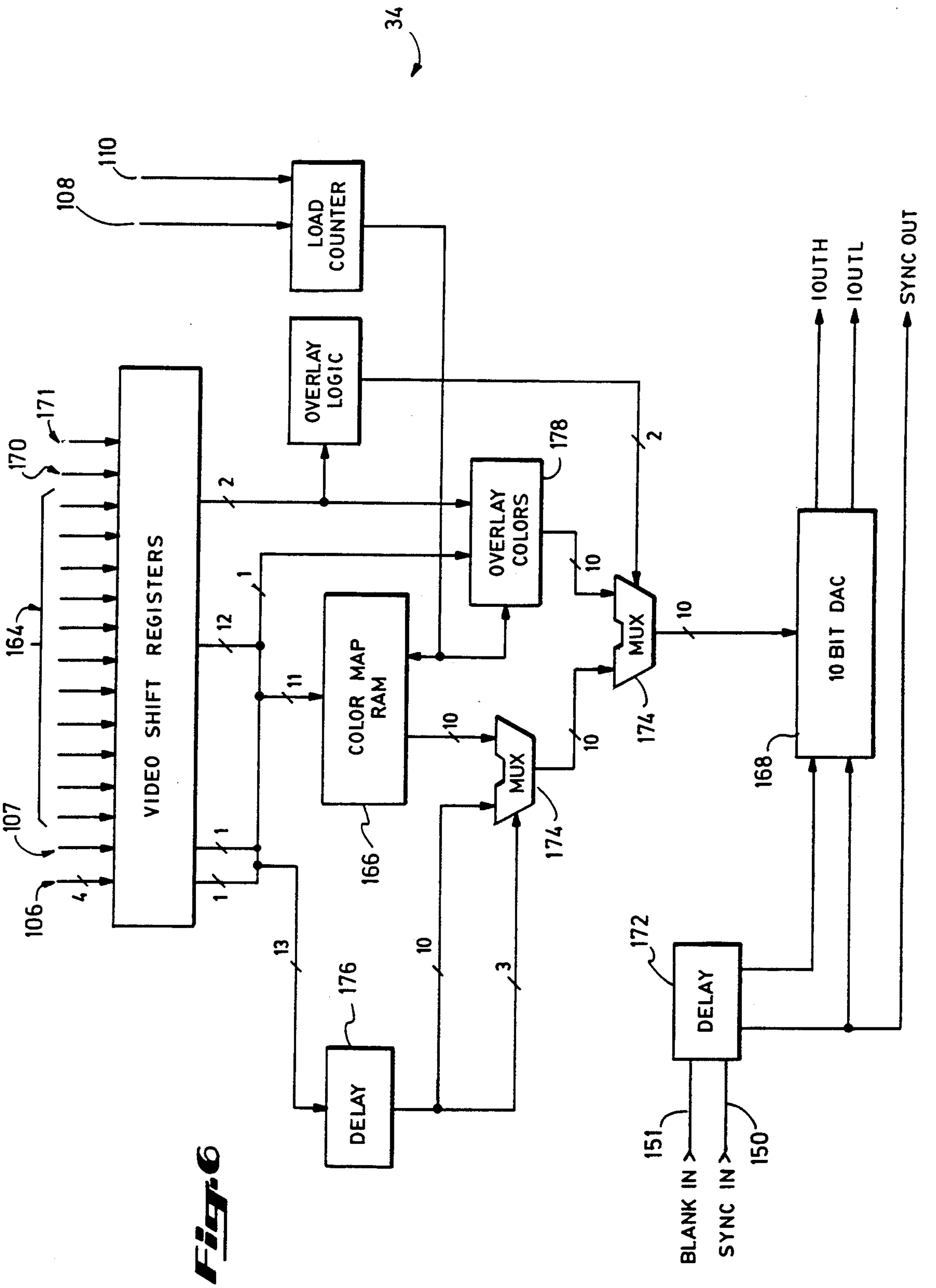
FIG. 6 is a block diagram of a video digital to analog converter which is employed to carry out the present invention.

To implement the semaphore, the system timing generator 38 generates a LOAD signal 108 and an INHIBIT signal 110, shown in FIGS. 4, 5 and 6, and has an interface to the VCPU 16. Before the LOAD signal 108 is asserted, the timing generator 38 checks the semaphore register 39. If the VCPU 16 has the semaphore (i.e., update of the frame buffer data path state table copy is in progress), the INHIBIT signal 110 is asserted with the LOAD signal 108, thus preventing the reading of the off-screen memory of frame buffer 24 into the data path state tables during that vertical retrace. The INHIBIT signal 110 remains asserted for the entire interval during which the VCPU updates the copy of the state tables in off-screen memory of frame buffer 24. The data path logic units keep their previous state table values, which were valid. Since the data path logic units continue to use a set of valid values, a screen glitch is prevented.

If the VCPU 16 does not have the semaphore when the timing generator 38 is ready to assert the LOAD signal 108, then the timing generator 38 claims it and keeps it until vertical retrace is over. The VCPU 16 must then wait until the reading of the off-screen memory of frame buffer 24 into the data path logic units 29 is complete before it begins modifying the off-screen memory of frame buffer 24.

Referring now to FIGS. 4, 5 and 6, a preferred embodiment of the present invention is illustrated. Bit sizes of the various buses, shown in the conventional manner, are exemplary only, and are not by way of limitation. It is to be understood that FIGS. 4, 5 and 6 illustrate the primary flow paths of data and are not intended to illustrate all control lines. For example, for proper operation, the various circuit components are presumed to be provided with a proper clock signal in a conventional manner.

FIG. 4 illustrates a preferred embodiment of the pixel map logic unit 32. Pixel data from the on-screen memory of frame buffer 24 via multiplexer 37 is input to the pixel map logic unit via a set of data input lines 102. The data input lines 102 carry sufficient bits to define a pixel, in a preferred embodiment 24 bits. Additional data input lines 102 may be provided to accommodate overlay planes. The number of bits in the data input lines 102 equals the number of planes in the frame buffer 24. In a preferred embodiment, a 24 plane frame buffer provides 24 bits per pixel.

The pixel map logic unit 32 is provided with a window number input 104. The window number input 104 carries sufficient bits to specify one of a plurality of windows, such as for example, 64 windows. The window number input 104 provides a window number from the window/cursor control 30, an embodiment of which is shown in FIG. 5 and described below. The LOAD input 108 and the INHIBIT input 110 are provided to control the loading of data into the various registers in the pixel map logic unit 32. A load data input 106 provides the data from the off-screen memory of the frame buffer 24 via multiplexer 37 to be loaded into the various registers under the control of the LOAD input 108 and the INHIBIT input 110.

On each clock pulse, a pixel value at the pixel data input lines 102 and a window number at the window number input 104 are input into the pixel map logic unit 32. The window number input 104 determines how the pixel values at the pixel input lines 102 are processed to form a set of three 11 bit index values 164. The mapping information is stored in a mapping memory 112, one of the pixel map logic unit's state tables, which is addressed by the window number input 104.

As understood from FIG. 4, the load data input 106 loads the mapping memory 112. In a preferred embodiment, the mapping memory 112 contains register space for 64 mapping configuration words, one mapping configuration word for each window number. The mapping configuration words and their use in a preferred embodiment are explained more fully below.

In addition to loading the mapping memory 112, the load data input 106 provides data to the base address multiplexer (MUX) 114, another of the pixel map logic unit's state tables. The pixel map logic unit 32 processes pixel data from the frame buffer 24 according a specified pixel datatype for each window. The processed pixel value produced in the pixel map logic unit 32 is then converted into an index into a physical colormap in the VDACs 34. These index values are indicated in FIG. 4 as set of index values 164 and are input into the VDACs 34 as shown in FIG. 6. This conversion is accomplished by adding a base value from the mapping memory 112 to the pixel value. The base value is selected based on the window containing this pixel. The pixel value is therefore a relative index into a window's virtual colormap, which is pointed to by the base value.

One example of the mapping configuration word is as follows:

| | | | | | | | | | | | |
|---|---|---|---|---|---|---|---|---|---|---|---|
| 2 | 2 | 2 | 2 | 2 | 1 | 1 | 1 | 1 | 1 | 0 | |
| 7 | 6 | 5 | 4 | 0 | 9 | 6 | 5 | 2 | 1 | 0 | bit |
| V | Mod | | Shift | | Mask | | #Planes | | Base Value | | field |

The mapping configuration word is broken into fields as shown to control the various sections of the pixel map logic unit 32. One of the mapping configuration words is output from the mapping memory 112 onto the mapping configuration word bus 116. The "shift" field, as shown in the above example, carries, for example, 5 bits which are input into a barrel shift 118 via a shift bus 120. The barrel shift 118 shifts the mapping configuration word by a number of bits equal to the digital value on the shift bus 120.

Referring now to FIG. 5, the Window/Cursor Control 30 which may be employed in carrying out the present invention is shown. The Window/Cursor Control 30 provides two basic functions, hardware window support and hardware cursor support.

As with the Pixel Map Logic Unit 32, the Window/-Cursor Control 30 is responsive to the LOAD input 108 and the INHIBIT input 110. When the timing generator 38 captures the semaphore as stored in the register 39, the LOAD input 108 goes to a high state enabling update of the state tables of the Window/Cursor control 30. This LOAD signal is triggered by the video graphics subsystem's vertical sync so that update occurs only during vertical retrace. If more data must be loaded into the state tables of the Window/Cursor Control 30 than can be loaded in one vertical retrace, then, just before the vertical retrace is complete, the INHIBIT input goes to a high state pausing the loading of the state tables.

Also as with the Pixel Map Logic Unit 32, data is loaded into the Window/Cursor Control 30 by way of the load data input 106. The load data input 106 inputs data into a LOAD Control 140 which either enables or disables the loading of data as indicated by the value in the semaphore register 39. If the semaphore indicates that data is to be loaded, the data is sent to a Cursor Data Interface 142 or to a Bus Transceiver (XCVR) 144 as dictated by the internal logic of the Window/Cursor Control 30 in a manner known in the art. A Test Bus 146 is provided, and it is a bi-directional bus. The Bus transceiver 144 permits data to be sent from the Test Bus 146 to a set of Window Definition Registers 148 or to permit the data from the Window Definition Registers 148 to be written onto the Test Bus 146.

A Sync input 150 provides a composite signal which includes information about the horizontal and vertical sync signals of the video graphics subsystem 6. A Sync separator (Sync Sep) 152 is provided to separate the vertical and horizontal sync signals to provide clock signals to an X counter 154 and to a Y counter 156. Thus, the Window/Cursor Control 30 calculates the position of the CRT refresh logic for the monitor 8 via a set of internal X and Y counters. By using the monitor's sync signal via the sync input 150 and the monitor's blank signal via blank input 151, the Window/Cursor Control 30 is able to keep these counters synchronous with the refresh and retrace cycles of the monitor 8. At all times, the values of the X Counter 154 and the Y Counter 156 correspond with the actual refresh process on the CRT 8. On every clock cycle, these counter values are compared with the programmed cursor position and all of the window definition registers 148. The origin is in the upper left, with increasing X values to the right and increasing Y values downward.

The Window/Cursor Control 30 has two primary sections, a cursor section which comprises the Cursor Data Interface 142 (and the elements that it communicates with) and a window section which comprises the Bus XCVR 144 (and the elements that it communicates with). The window section computes three sets of outputs. The first is the window number which for each pixel, is sent to the pixel map logic units 32. Next, the window/cursor control 30 computes a double buffer select signal which is used to select one of two banks of RAM chips to enable double buffering on a per-window basis. The final value that the window/cursor control 30 computes is used internally as clipping information for the Cursor and is used to allow the cursor to appear in selected windows. This feature may be used when displaying a hairline cursor in a window. This signal will clip the cursor allowing it to appear only in unoccluded portions of selected windows.

The cursor section computes two values, a cursor 0 output 170 and a cursor 1 output 171. These values are input to VDACs 34 as an index into the hardware colormap as described with regard to FIG. 6. The cursor section develops a sprite cursor in a manner known in the art.

The Window Definition Registers 148 send window definitions to a set of window detectors 158. If two or more windows overlap, then the overlap will encompass pixels within both windows. The window detectors 158 in turn determine if a pixel is or is not within a window and provide window descriptions to a priority tree 160. The priority tree 160 determines, of those windows defined, which is the highest priority for each pixel. In other words, if window A and window B overlap and window A covers up part of window B, window A has the higher priority and will be assigned on a window no. output 162. If a particular pixel is not contained in any window, a default window mapping is output as a background.

Referring to FIG. 6, one example of the VDAC 34 which employs the present invention is shown. One such VDAC 34 is provided for each of the red, green and blue channels of the monitor 8. The VDAC 34 includes the LOAD input 108 and the INHIBIT input 110. When the various registers of the VDAC 34 are to be updated, the VCPU 16 verifies that the semaphore is available (the shadow copy of the state table data in frame buffer 24 is not being updated) and captures it. At the beginning of vertical retrace, the LOAD input 108 goes to a high state enabling the loading of the VDAC 34 registers. At that point, the VDAC 34 registers are updated through the load data input 106. If more data must be loaded into the registers than can be loaded during one vertical retrace, the INHIBIT input 110 goes to a high state, thus pausing register update. At the end of the active video refresh, the INHIBIT input 110 again goes to a low state and the loading of the registers continues to completion.

The pixel map logic units 32 provide the set of index values 164 for each of the red, green and blue channels of the VDAC 34. Each of the index values 164 is four bits wide (one bit from each of the four pixel map logic units 32). Since each index value 164 indexes a location into a color map RAM 166, each window can use a different portion of color map RAM 166, and each window is provided with full color independently of other windows. Similarly, cursor 0 input 170 and cursor 1 input 171 each indexes its own location into a color map RAM 166 to provide for a three colored cursor that can therefore be seen against any color of background or window. Each bit is then routed via a set of multiplexers 174 to a DAC 168 where it is converted to an analog value which drives either the red, green or blue channel of the monitor. The blank signal via blank input 151 and sync signal via sync input 150 are input to adjustable delay 172 to compensate for other delays in the video graphics subsystem. The mapping scheme as herein described can be optionally disabled by map enable input 107. Asserting map enable input 107 bypasses color map RAM 166 through delay 176 which provides sufficient delay to match that of color map RAM 166. In a preferred embodiment, the DAC 168 is capable of driving a one volt ground referenced RS343 compatible video into a 75 ohm cable.

Cursor 0 input 170 and cursor 1 input 171 are used to select pixel by pixel between video data or three overlay colors. When both cursor 0 input 170 and cursor 1 input 171 are zero, the video data is selected. The three other input states select one of three overlay color registers in an overlay colors register 178. The overlay colors register 178 is updated by data from the load data input 106 under the control of the LOAD input 108 and the INHIBIT input 110 in accordance with the present invention. Thus, a cursor may have colors different from all the colors in the color map RAM 166.

Figure 7:
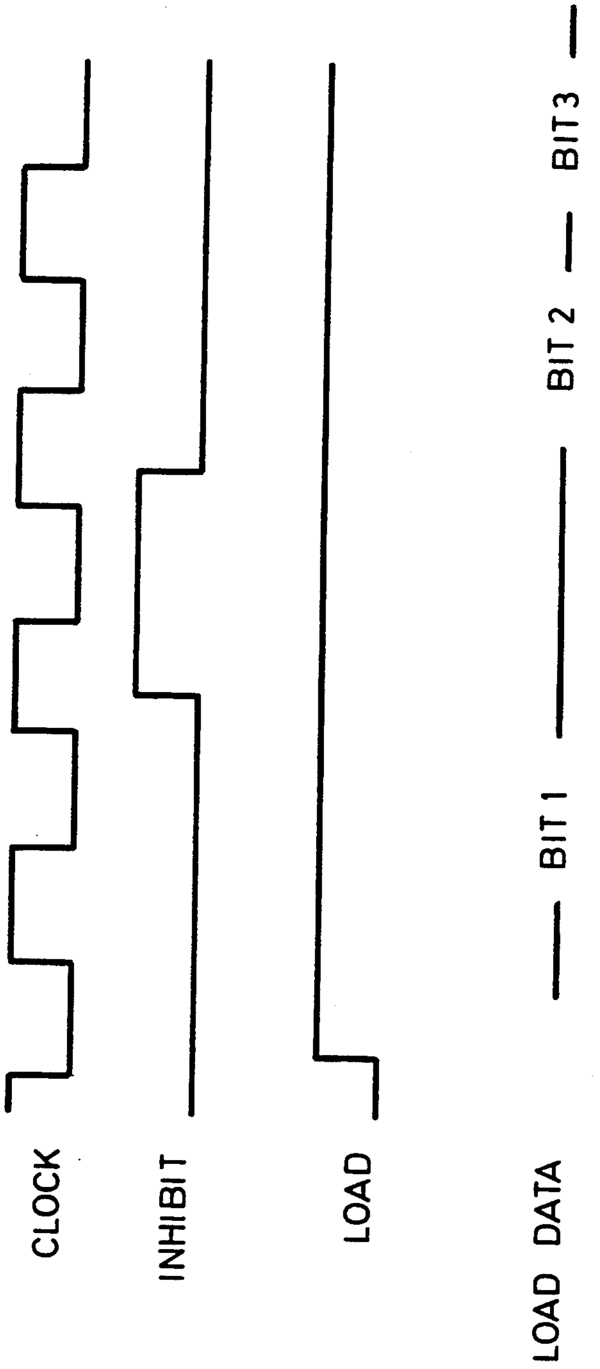
FIG. 7 is a timing diagram demonstrating the effect of the invention on the loading of data into state tables.

Referring now to FIG. 7, the process for loading the various registers in the data path begins when the LOAD signal on the LOAD input 108 transitions from the '0' to '1' state. At this time, register <0> (i.e., the first register in the first data path logic unit to be written) is internally addressed. The data path will accept load data from load data input 106 on every clock whenever the INHIBIT 110 input is in the '0' state and will write the into the internal register after 16 bits have been loaded into the data path chips (4 clocks). Loading begins on the first clock for which the LOAD signal is in the high state, is disabled on any clock for which the INHIBIT signal is in the high state, resumes at that point on the next clock for which the INHIBIT signal is in the low state, and ends when the LOAD signal goes into the low state again.

The sequence for loading the various registers in the data path may be enabled for more data than is required by the state tables in the data path logic. After all the internal registers in the data path are loaded, the data path state tables ignore all additional data until the LOAD signal returns to the '0' state. At that time, the loading process is terminated, and the data path logic begins its normal operation.

In addition, partial loading of the state tables in the data path can be accomplished by asserting the INHIBIT signal after all the desired data is loaded into the state tables and keeping it asserted until the LOAD signal returns to the '0' state. This allows the loading of data which may describe a cursor, for example, rather than loading data to be written into all registers. This is advantageous because, as a general rule, cursor data changes more often that window data.

This invention also allows a demand load mode, in which the data path logic units 29 are only loaded if the CPU has claimed the semaphore since the last time they were loaded. In that case, the CPU will always get the semaphore, except when there has been no vertical retrace since the last time the shadow state tables were changed.

The principles, preferred embodiments and modes of operation of the present invention have been described in the foregoing specification. The invention is not to be construed as limited to the particular forms disclosed, since these are regarded as illustrative rather than restrictive. Moreover, variations and changes may be made by those skilled in the art without departing from the spirit of the invention.

What is claimed is;

1. In a computer graphics system having a central processing unit, a video output logic section having state tables with values for processing information to be displayed on a monitor, and memory having a copy of the state table values, the copy of the state table values comprising writing and reading blocks of information, a method for updating the memory comprising the steps of:

a. enabling the control of the memory either to be written into by the central processing unit or to be read from by the video output logic section such that either the central processing unit or the video output logic section is granted control of the memory and the other is denied control of the memory until control of the memory is explicitly released by the central processing unit upon completion of writing into the memory or the video output logic section upon completion of reading from the memory;

b. if the central processing unit has control of the memory, atomically writing a writing block of information to the memory by the central processing unit to the exclusion of the video output logic section until all of the writing block of information has been written to the memory;

c. if the video output logic section has control of the memory, atomically reading a reading block of information from the memory by the video output logic section to the exclusion of the central processing unit until all of the reading block of information to be read has been read from the memory thereby updating the values in the state tables of the video output logic section; and d. repeating step (a).

2. The method of claim 1 wherein step c is performed only upon the condition that step b as been performed since the last performance of step c.

3. The method of claim 1 wherein the step of reading occurs during a vertical retrace period of the monitor.

4. The method of claim 1 and further including the step of using the state table information to process data to display on the monitor.

5. In a computer graphics system having a central processing unit, a video output logic section having state tables with values for processing information to be displayed on a monitor, and memory having a copy of the state table values, the copy of the state table values comprising writing and reading blocks of information, a method for updating the memory comprising the steps of:

a. providing an arbitration device selectively controlled alternatively by either the central processing unit or the video output logic section;

b. controlling the writing of a writing block of information into the memory or the reading of a reading block of information from the memory by providing exclusive control of the arbitration device respectively to the central processing unit or to the video output logic section;

c. sensing to determine if the reading block of information is currently being read from the memory;

d. if the reading block of information is being read from the memory, (i) providing exclusive control of the arbitration device to the video output logic section; and (ii) continuing atomically to read the reading block of information from the memory until all the reading block of information has been read there by updating the value in the state tables of the video output logic section, whereby, while the reading block of information in the memory is being read, no writing block of information can be written into the memory; and e. if the reading block of information in the memory is not being read, (i) providing exclusive control of the arbitration device to the central processing unit, (ii) commencing the writing of the writing block of information into the memory, and (iii) continuing atomically to write the writing block of information into the memory until all the writing block of information has been written, whereby, while the writing block of information is being written into the memory, no reading block of information can be read from the memory by the video output logic section.

6. The method of claim 5 wherein the writing of information into the memory by the central processing unit occurs during a vertical retrace period of the monitor.

7. The method of claim 5 further comprising the step of pausing the writing of information into the memory for a selected period of time after performance of step (e)(ii).

8. The method of claim 5 further comprising the step of pausing the reading of information from the memory for a selected period of time after performance of step (d)(ii).

9. The method of claim 5 and further including the step of using the state table information to process data to display on the monitor.

10. A video graphics system comprising:

a. a first memory for storing pixel values;

b. a second memory for storing state table values;

c. a central processing unit for loading pixel values into the first memory and for loading state table values into the second memory;

d. a video output logic section having state tables, the video output logic section providing means for reading the state table values from the second memory into the state tables of the video output logic section and for processing pixel values for display; and e. an arbitration device which precludes the loading of the state table values into the second memory simultaneously with the reading of the state table values from the second memory into the state tables of the video output logic section.

11. The video graphics system according to claim 10 wherein the video output logic section comprises a plurality of video output logic units, some of which provide pixel mapping logic and some of which provide digital to analog conversion, each said unit being implemented on a separate integrated circuit chip.

12. The video graphics system according to claim 10 and including a monitor for displaying the pixel values.

13. The video graphics system according to claim 10 and including means for atomically reading the values from the second memory only when values are not being written into the second memory.

14. The video graphics system according to claim 10 and including means for atomically writing the values into the second memory only when values are not being read from the second memory by the video output logic section.

15. The video graphics system according to claim 10 wherein the arbitration device includes a register having a value for controlling access by the central processing unit and the video output logic section.

16. The video graphics system according to claim 10 wherein the first memory and the second memory comprise a frame buffer.

* * * * *

UNITED STATES PATENT AND TRADEMARK OFFICE
CERTIFICATE OF CORRECTION

PATENT NO. : 5,058,041

DATED : October 15, 1991

INVENTOR(S) : Rose et al

It is certified that error appears in the above-identified patent and that said Letters Patent is hereby corrected as shown below:

Column 11, line 46, change "value" to --values--.

Signed and Sealed this

Fourth Day of May, 1993

Attest:

Michael K. Kirk

MICHAEL K. KIRK

*Attesting Officer*

*Acting Commissioner of Patents and Trademarks*